United States Patent
Jaber et al.

(10) Patent No.: US 12,020,693 B2
(45) Date of Patent: Jun. 25, 2024

(54) SYSTEM AND METHOD FOR OUT-OF-VOCABULARY PHRASE SUPPORT IN AUTOMATIC SPEECH RECOGNITION

(71) Applicant: Samsung Electronics Co., Ltd., Suwon-si (KR)

(72) Inventors: Suhel Jaber, San Jose, CA (US); Anil Yadav, Cupertino, CA (US); Melvin Lobo, Fremont, CA (US); Sukrat Gupta, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 193 days.

(21) Appl. No.: 17/160,278

(22) Filed: Jan. 27, 2021

(65) Prior Publication Data

US 2021/0343277 A1 Nov. 4, 2021

Related U.S. Application Data

(60) Provisional application No. 63/017,606, filed on Apr. 29, 2020.

(51) Int. Cl.
*G10L 15/14* (2006.01)
*G10L 25/27* (2013.01)

(52) U.S. Cl.
CPC .............. *G10L 15/14* (2013.01); *G10L 25/27* (2013.01)

(58) Field of Classification Search
CPC ......... G10L 15/00; G10L 15/14; G10L 15/18; G10L 15/1815; G10L 15/1822; G10L 15/19; G10L 15/26
See application file for complete search history.

(56) References Cited

U.S. PATENT DOCUMENTS

| | | | | |
|---|---|---|---|---|
| 9,190,055 B1 * | 11/2015 | Kiss | ...................... | G10L 15/063 |
| 9,454,957 B1 * | 9/2016 | Mathias | ................. | G06F 40/295 |
| 10,366,690 B1 * | 7/2019 | Sarikaya | ................. | G10L 25/54 |
| 10,446,147 B1 * | 10/2019 | Moniz | .................... | G06F 40/205 |
| 10,482,885 B1 * | 11/2019 | Moniz | ..................... | G06F 3/167 |
| 10,515,625 B1 * | 12/2019 | Metallinou | ............. | G06F 3/167 |
| 10,522,134 B1 * | 12/2019 | Matsoukas | ............. | G10L 15/30 |
| 10,565,986 B2 * | 2/2020 | Kakirwar | ............ | G10L 15/1822 |
| 10,600,406 B1 * | 3/2020 | Shapiro | .................... | G10L 15/22 |
| 11,043,205 B1 * | 6/2021 | Su | ......................... | G10L 15/183 |
| 11,410,646 B1 * | 8/2022 | Erbas | .................. | G10L 15/1822 |
| 11,817,090 B1 * | 11/2023 | Moore | .................. | G10L 15/187 |

(Continued)

OTHER PUBLICATIONS

Velikovich, Leonid. "Semantic model for fast tagging of word lattices." 2016 IEEE Spoken Language Technology Workshop (SLT). IEEE, 2016. (Year: 2016).*

(Continued)

*Primary Examiner* — Paras D Shah

(57) ABSTRACT

An electronic device includes an audio sensor, a memory, and at least one processor coupled to the audio sensor and the memory. The at least one processor is configured to receive, via the audio sensor an audio input. The at least one processor is further configured to perform, using an automatic speech recognition (ASR) model and an entity prediction model, out-of-vocabulary prediction of an entity. The at least one processor is further configured to receive an ASR hypothesis including the predicted entity. The at least one processor is further configured to output text including the predicted entity.

20 Claims, 9 Drawing Sheets

(56) References Cited

U.S. PATENT DOCUMENTS

| | | | |
|---|---|---|---|
| 2008/0154600 | A1 | 6/2008 | Tian et al. |
| 2015/0278203 | A1 | 10/2015 | Barad et al. |
| 2017/0148431 | A1 | 5/2017 | Catanzaro et al. |
| 2018/0268141 | A1 | 9/2018 | Hagen et al. |
| 2019/0007711 | A1* | 1/2019 | Geva .................. H04N 21/84 |
| 2020/0065651 | A1 | 2/2020 | Merity et al. |
| 2020/0104362 | A1* | 4/2020 | Yang .................... G06N 3/08 |
| 2020/0357388 | A1* | 11/2020 | Zhao .................. G10L 15/183 |
| 2021/0064822 | A1* | 3/2021 | Velikovich ........... G10L 15/083 |

OTHER PUBLICATIONS

International Search Report and Written Opinion of the International Searching Authority in connection with International Application No. PCT/KR2021/005129 dated Aug. 10, 2021, 7 pages.

Deutsch et al., "A General-Purpose Algorithm for Constrained Sequential Inference", Proceedings of the 23rd Conference on Computational Natural Language Learning, Hong Kong, China, Nov. 3-4, 2019, 11 pages.

Mihov et al., "Fast Approximate Search in Large Dictionaries", Computational Linguistics, vol. 30, No. 4, Mar. 25. 2004, 27 pages.

Daciuk et al., "Smaller representation of finite state automata", Theoretical Computer Science, vol. 450, 2012, 12 pages.

* cited by examiner

SYSTEM AND METHOD FOR OUT-OF-VOCABULARY PHRASE SUPPORT IN AUTOMATIC SPEECH RECOGNITION

CROSS-REFERENCE TO RELATED APPLICATION AND PRIORITY CLAIM

This application claims priority under 35 U.S.C. § 119(e) to U.S. Provisional Patent Application No. 63/017,606 filed on Apr. 29, 2020, which is hereby incorporated by reference in its entirety.

TECHNICAL FIELD

This disclosure relates generally to machine learning systems. More specifically, this disclosure relates to systems and methods for out-of-vocabulary phrase support in automatic speech recognition.

BACKGROUND

Modern automatic speech recognition (ASR) approaches, especially end-to-end models, are desirable because of their ease to train, their maintainability and their higher robustness and scalability when it comes to the recognition of standard language, but are often unusable in applications that require accurate recognition of many out-of-vocabulary named entities and open titles. In modern ASR architectures it is difficult to support successful recognition of named entities, such as "Miloš Forman," and open titles, such as "One Flew Over the Cuckoo's Nest" for multiple reasons. Such entities are very fixed and there is no room for approximation in their recognition, especially because that is usually a preliminary step for search applications in commercial use cases, which are not very robust to variations. For example, an ASR model can fail when a film title is uttered and the output name for a director turns into a search failure which turns into a video service and virtual assistant failure.

Such entities are also difficult to find in running text, which modern ASR architectures typically require as input data for training a model. The trend in modern ASR is to move towards neural architectures, sometimes even end-to-end systems, which makes compositional approaches unfeasible, and huge amounts of complete utterance samples necessary. If the model was never trained with a sizeable amount of complete utterances including the exact entities, then those entities will hardly be supported, and that is the case for most of the entities in a large database like tracks, albums and artists, or given names and surnames.

Synthetic data generation or data augmentation approaches are usually employed to overcome the aforementioned issues, but with little success due to the fact that models will learn based on the distribution of data in the dataset, and modeling a plausible distribution of the entities and the rest of the language in the complete utterances across the synthetic dataset is cumbersome and can be unsatisfactory for nontrivial domains. Also, for some types of entities and open titles, such as music, film, people, places, there are just too many entries to possibly include them all in the synthetic dataset with a distribution suitable for their correct learning by the model, so support is usually limited only to the most popular entities, which only cover a limited percentage of user needs. A dataset of synthetically generated utterances, by definition, can typically only cover a limited number of language usage patterns, so when it is used by itself it gives rise to modeling gaps, whereas when it augments real data it usually ends up shadowing it.

Open titles can be full-fledged sentences in themselves, and model accuracy is decreased by their embedding in larger utterances because it is not constrained by many of the sentence composition rules that apply to standard language, so the model is thrown off. It increases utterance length even further, and robustness of modern ASR models usually decreases with sentence length.

SUMMARY

This disclosure provides systems and methods for out-of-vocabulary phrase support in automatic speech recognition.

In a first embodiment, an electronic device includes an audio sensor, a memory, and at least one processor coupled to the audio sensor and the memory. The at least one processor is configured to receive, via the audio sensor an audio input. The at least one processor is further configured to perform, using an automatic speech recognition (ASR) model and an entity prediction model, out-of-vocabulary prediction of an entity. The at least one processor is further configured to receive an ASR hypothesis including the predicted entity. The at least one processor is further configured to output text including the predicted entity.

In a second embodiment, a method for out-of-vocabulary phrase support in automatic speech recognition (ASR) includes receiving, via an audio sensor of an electronic device, an audio input. The method further includes performing, by at least one processor of the electronic device and using an ASR model and an entity prediction model, out-of-vocabulary prediction of an entity. The method further includes receiving an ASR hypothesis including the predicted entity. The method further includes outputting text including the predicted entity.

In a third embodiment, a non-transitory computer readable medium embodies a computer program. The computer program includes instructions that when executed cause at least one processor of an electronic device to receive, via an audio sensor of the electronic device, an audio input. The computer program also includes instructions that when executed cause the at least one processor to perform, using an automatic speech recognition (ASR) model and an entity prediction model, out-of-vocabulary prediction of an entity. The computer program also includes instructions that when executed cause the at least one processor to receive an ASR hypothesis including the predicted entity. The computer program also includes instructions that when executed cause the at least one processor to output text including the predicted entity.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
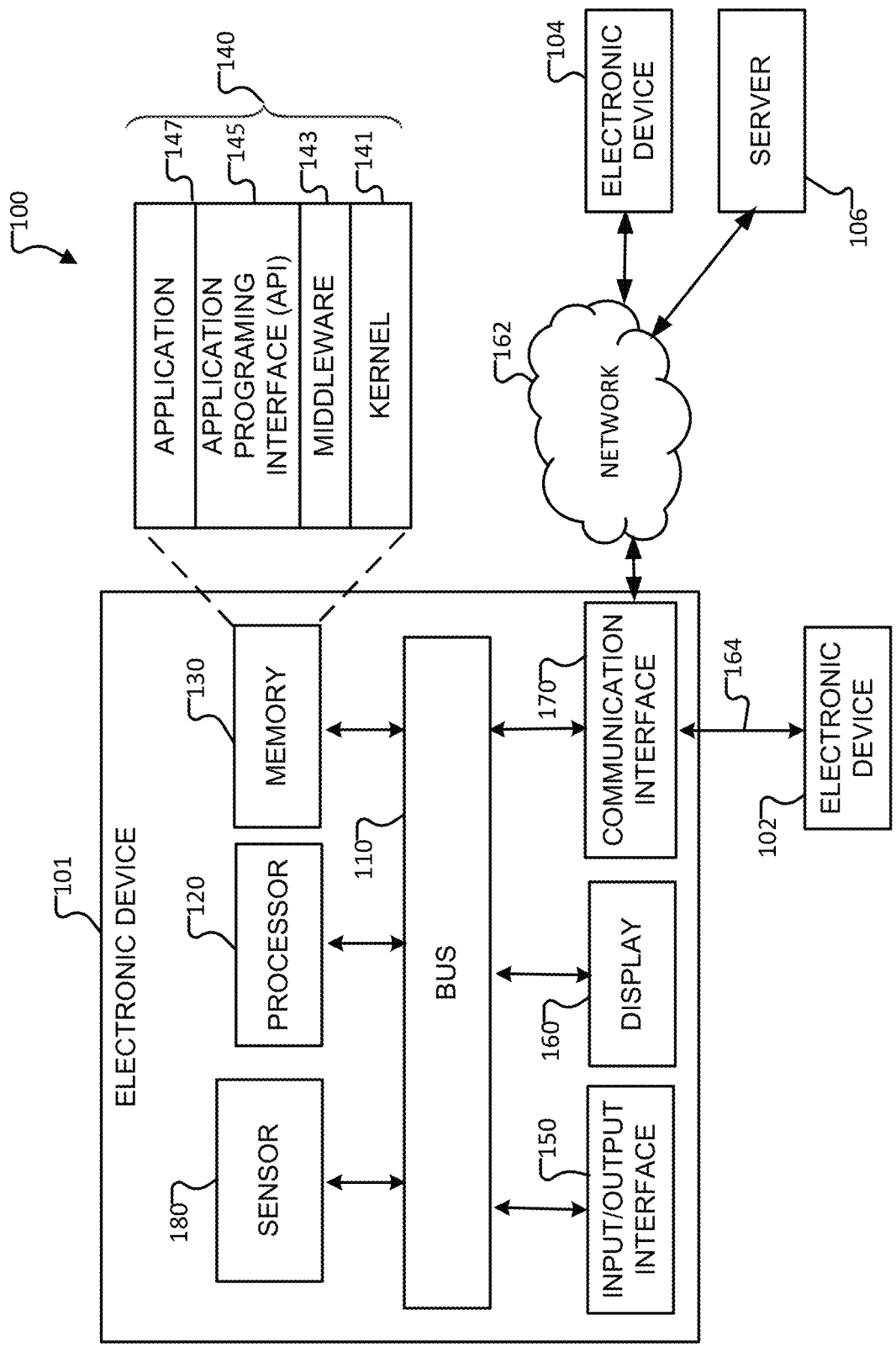
FIG. 1 illustrates an example network configuration in accordance with various embodiments of this disclosure.

FIGS. 1 through 8, discussed below, and the various embodiments of this disclosure are described with reference to the accompanying drawings. However, it should be appreciated that this disclosure is not limited to these embodiments and all changes and/or equivalents or replacements thereto also belong to the scope of this disclosure.

Performing on-device artificial intelligence (AI) inferences allows for convenient and efficient AI services to be performed on user devices, such as providing natural language recognition for texting or searching services, music or video playback services, phone application or other communication services, or other services. To provide on-device AI inferences, a model owner can deploy a model onto a device via an AI service installed on the device. To perform AI inferences, an automatic speech recognition (ASR) model can be used to receive audio data including a user request taken from an audio sensor and convert the audio data to text for use by an AI inference service to determine what action to perform from the user request. AI models can also be used to tag ASR text with labels, such as domain labels. In some cases, a client, such as an installed application on the device, can request an inference, such as a request to play a song, perform a web search, call a contact, or other requests. The AI inference service can provide data to one or more AI models and receive in return the command determined by the model to be performed. The AI service can receive the results from the models to and provide an inference result to the client, and the client can display the inference result to the user.

This disclosure provides systems and methods for out-of-vocabulary phrase support in automatic speech recognition. An out-of-vocabulary phrase can be, for example, a named entity or an open title. Embodiments of this disclosure enhance modern ASR approaches with the capability to accurately support prediction of out-of-vocabulary phrases, thereby allowing their use across many applications. The issues with existing solutions described herein have also been discovered to be the cause of the proliferation of multiple models in a same system, each dealing with a specific domain. This approach is less than optimal, because it relies on using a general domain ASR system to output a preliminary transcription, which gets subsequently fed to a domain detector, which in turns identifies what domain-specific ASR system to redirect the original audio utterance to. This pipeline can cause cascading errors and increases latency and application complexity. Embodiments of this disclosure use the development, running, and maintenance of a single system covering all supported domains at once.

Expanding ASR systems to support new out-of-vocabulary phrases generally requires retraining them, which is expensive not just in terms of money, but also in terms of time: usual training times of days, if not weeks, translate into the necessity to release additional temporary hardcoded patches to solve bugs in production systems that cannot wait for the next trained model deployment. These patches are very limited in their effectiveness and scope, but still require thorough testing to avoid deleterious interference with correct model output, and continuous maintenance to ensure obsolete patches get removed as soon as the gaps they were supposed to address get covered by newer models. Embodiments of this disclosure allow model training to be deferred to when the data presents new language usage patterns, and allows hotfixing the out-of-vocabulary phrase coverage at any time in the application lifecycle, such as between deployments, through the continuous expansion of a database, which is a much more principled and maintainable computational device for managing persistent knowledge.

The music domain alone contains roughly 10 million phonetically unique entities and keeps expanding in size. As explained, trying to solve the problem by increasing the training dataset with multiple utterances per entity has proved a challenge, but aside from the approach's success rate, its immediate effects are an increase in training time and in final model size, which translate into slower release cycles, slower runtimes and larger costs in network, memory, and computations. Embodiments of this disclosure allow for the generation of leaner, faster, and less expensive models.

FIG. 1 illustrates an example network configuration 100 in accordance with various embodiments of this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, and a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), a graphics processor unit (GPU), an application processor (AP), or a communication processor (CP). The processor 120 is able to perform control on at least one of the other components of the electronic device 101 and/or perform an operation or data processing relating to communication. In accordance with various embodiments of this disclosure, the processor 120 can operate both an ASR model and an entity prediction model coupled to a knowledge base to perform speech recognition and entity searching and domain or class prediction, including out-of-vocabulary phrase prediction.

The memory 130 can include a volatile and/or nonvolatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS). In some embodiments, the memory 130 can be a memory used by an AI model, such as an ASR model, which may be stored on the electronic device 101, an electronic device 102, an electronic device 104, or a server 106.

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 can include an application running on the electronic device 101 such as an inference service, an ASR model, an entity prediction model, and/or various client applications.

The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control. In some embodiments, the API 145 includes functions for requesting or receiving AI models from an outside source.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as signals received by the communication interface 170 regarding AI models provided to the electronic device 101.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 can include one or more cameras or other imaging sensors, which may be used to capture images of scenes. The sensor(s) 180 can also include one or more audio sensors such as one or more microphones.

The sensor(s) 180 can also include one or more buttons for touch input, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving a separate network. The electronic device 101 can also be an augmented reality wearable device, such as eyeglasses, that include one or more cameras.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function, according to embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101.

Although FIG. 1 illustrates one example of a network configuration 100, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
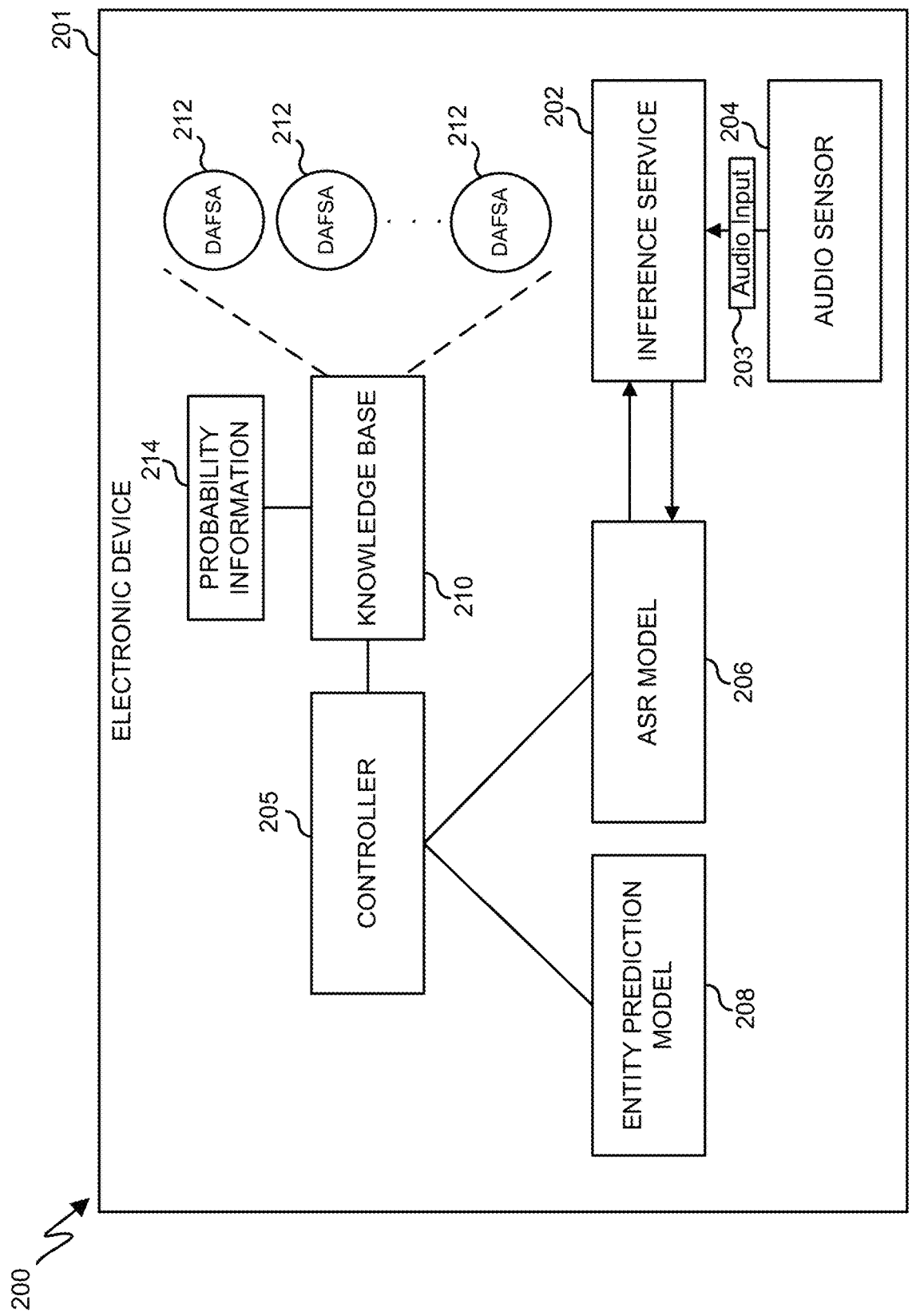
FIG. 2 illustrates an example out-of-vocabulary search architecture in accordance with various embodiments of this disclosure.

FIG. 2 illustrates an example out-of-vocabulary search architecture 200 in accordance with various embodiments of this disclosure. As shown in FIG. 2, the architecture 200 includes an electronic device 201, which may represent the electronic device 101 of FIG. 1. It will be understood that the architecture components illustrated in FIG. 2 can be controlled by a processor of the electronic device 201, such as the processor 120.

The electronic device 201 includes an inference service 202, such as a personal assistant or other application for receiving inference requests from a user and/or one or more applications stored on the electronic device 201. In some embodiments, the inference service 202 receives audio data or an audio input 203 that includes an inference request from an audio sensor 204. In some embodiments, the audio sensor 204 can be the sensor 180. The inference request can include a request to process an input and provide an inference result, such as a request to perform natural language understanding on an utterance provided by a user, the result of which is used to perform an action by a client application on the electronic device 201, such as playback of a song or video, performing a web search, booking a travel arrangement, calling a contact stored in a user's contact list, or other actions.

The electronic device 201 also includes a controller 205 configured to be executed by the processor and that is configured to control an overall speech recognition process with out-of-vocabulary phrase support using an automatic speech recognition (ASR) model 206, an entity prediction model 208, and a knowledge base 210. In various embodiments, the ASR model 206 can be rule-based, a machine learning model, a neural network, or other types of models. The inference service 202 provides the audio data received from the audio sensor 204 to the ASR model 206. The ASR model 206 performs speech recognition on the audio data to determine the contents of the utterance and convert the audio data to text data so that the electronic device 201 can understand the command being requested by the inference request, and determine which client applications are needed to fulfill the request. After processing the audio data, the ASR model 206 can return the results to the inference service 202, and the inference service 202 can trigger the command included in the utterance provided by the user. The entity prediction model 208 performs entity and domain or class prediction of one or more portions of the utterance. In various embodiments, the entity prediction model 208 can be rule-based, a machine learning model, a neural network, or other types of models. For example, in some embodiments, the entity prediction model 208 can be a neural model such as a feedforward neural network, a recurrent neural network (RNN) such as a long short-term memory (LSTM) model, or other neural network models. In some embodiments, the entity prediction model 208 can be a look up table or an n-gram that is used by the processor to look up domains based on parameters such as preceding verbs or other context in an utterance. In some embodiments, the entity prediction model 208 can be regular expression model, a grammar model, a template, a class-LM, or other language models that can predict classes.

Domain labels provide the inference service 202 with better understanding of which actions to perform. For example, if an utterance is determined by the ASR model 206 and the entity prediction model 208 to include "I WANT TO BUY TICKETS FOR MICHAEL JACKSON IN LAS VEGAS," portions of the utterance can be labeled with domains to provide better contextual understanding for the utterance and provide applications to perform the command. Various embodiments of this disclosure, such as shown in FIG. 2, provide a single system for performing a single-pass at runtime on such utterances and cover all supported domains at once, even within the same utterance. For example, the ASR model 206 and entity prediction model 208 can assign labels such as <ARTIST> to "MICHAEL JACKSON" and <PLACE> to "LAS VEGAS" to categorize the utterance into one or more domains. Other portions of the utterance, such as "BUY TICKETS" can provide context to the ASR model 206 and the entity prediction model 208 that narrows domain labels. For example, "BUY TICKETS" can signal to the ASR model 206 and entity prediction model 208 that "MICHAEL JACKSON" could apply to an <ARTIST> label or even a <MOVIE> label, with the models providing different probabilities for each label, while excluding other labels such as <DIRECTOR> because tickets are typically purchased for a music artist or a movie title, but not typically by referencing a director. Such other portions of the utterance converted to text by the ASR model 206 can also be used by the inference service 202 to determine actions to perform and applications to perform the actions, such as, for the utterance above, commanding a concert ticketing application to retrieve ticket options to present to the user for Michael Jackson concerts in Las Vegas.

The knowledge base 210 is accessed by the controller 205 during the speech recognition with out-of-vocabulary support process. In some embodiments, both the ASR model 206 and the entity prediction model 208 can access the knowledge base directly. The entity prediction model 208 identifies, in conjunction with the knowledge base 210 and the ASR model 206, potential non-overlapping spans of entities in a user utterance, and associated domains having a confidence score. The knowledge base 210 provides a comprehensive listing of all entities or open tiles for each domain. For example, the knowledge base 210 can include a plurality of deterministic acyclic finite state automatons (DAFSA) 212. A DAFSA is a data structure that represents a set of strings. In various embodiments of this disclosure, a DAFSA 212 is used to generate a one or more strings to constrain subsequent output of the ASR model 206 concerning an out-of-vocabulary word or phrase to the strings in the DAFSA 212. For example, at each time step, the DAFSA 212 transitions to a new state to constrain a next output for the ASR model until all input symbols have been consumed.

Each DAFSA 212 is associated with a domain label. For example, the knowledge base 210 can include a <MUSIC> DAFSA, an <ARTIST> DAFSA, a <PLACE> DAFSA, and so on. As the ASR model 206 decodes portions of the utterance, the portions are provided to the entity prediction model 208 to identify the sets of nonoverlapping spans of entities and their domains. Once a label is predicted from preceding portions of an utterance using the entity prediction model 208, a DAFSA 212 is used to constrain the following ASR output to the content of the DAFSA 212. For example, the entity prediction model 208 can determine that an utterance portion or entity span could be associated with a <PLACE> domain label. In that case, a <PLACE> DAFSA 212 is accessed in the knowledge base and traversed to provide one or more candidates for an out-of-vocabulary word or phrase. In some embodiments, the knowledge base 210 can also include prior probability information 214 for out-of-vocabulary phrases, such as set popularities for certain entities based on past user-agnostic search results, or probability information based on user data, such as general user information, user preferences, user context and user history.

In some embodiments, the entity prediction model 208 can remove spans with low confidence scores from the potential set of spans. The entity prediction model 208 can also parse, deem invalid, or remove from the set of potential spans overlapping spans. Traversing the DAFSAs 212 provides entity candidates for the spans identified by the entity prediction model 208. Entity candidates are scored using a probability provided by the entity prediction model 208 combined with a probability provided by the ASR model 206. Based on the scores for the entity candidates, the best candidates for each entity in a span can be determined. Therefore, for each sets of spans, a hypothesis is provided including the candidates with the highest probability scores. In some embodiments, from all the hypotheses generated and based on the probabilities associated with the generated hypotheses, the ASR model 206 provides a final result or final ASR hypothesis to the inference service 202, allowing the inference service 202 to carry out other processes using the text provided by the ASR model 206.

In some embodiments, a controlling algorithm executed by the processor and/or the controller 205 can control the overall process flow described above. In some embodiments, the algorithm can be sequential, such that each component can provide a set of unique results. For example, the entity prediction model 208 can provide sets of non-overlapping spans of entities in a user utterance and their domain, the ASR model scores entities determined using the knowledge base as a candidate for each span in each set of the entity prediction model 208, and the processor, based on a policy, determines the final utterance among all the results output by the ASR model.

In some embodiments, the algorithm executed by the processor can be a parallel algorithm in which the algorithm operates as a character-level parsing or decoding algorithm, where the search space is explored in joint fashion as if it were a tree. In such an embodiment, the exploration of alternatives for a character represents a subtree rooted in each of the nodes that represent the alternatives for the previous character in the user utterance, recursively. The alternatives for each character can be whether it is part of an entity span of a certain domain or not, or for each entity provided by the knowledge base 210, whether the entity can be filled by the next available character of the entity or not. The ASR model 206 and the entity prediction model 208 can then be used to score intermediate tree branches. Based on the policy, the processor can then calculate the best path in the tree based on the score of intermediate tree branches. Some subtrees may be repeated. For example, in the utterance "PLAY LOVE SONG BY SARA BAREILLES" the alternatives for the substring "SARA BAREILLES" may be exactly the same regardless of whether "LOVE SONG" was considered entirely a title, a title and generic language, or entirely generic language. For the purpose of memory and speed efficiency in those cases, the processor can implement a memorization mechanism such as a dynamic programming table to save intermediate results once and avoid re-computing them.

In various embodiments, the entity search can either be exact or approximate. Using the exact or approximate approach can be based on consideration of accuracy/latency tradeoffs for each approach. Approximate search can be implemented differently based on whether the processor uses the sequential or parallel algorithm. In the sequential approach, components the ASR model 206 and the entity prediction model 208 output the most promising subset of their possible results. In the parallel approach, or beam search approach, the processor explores a fixed number of the most promising alternatives for each character, based on an immediate evaluation based on the policy of the intermediate scores output by the ASR model 206 and the entity prediction model 208 for each alternative.

The architecture 200 and the various embodiments of this disclosure assist with preventing cascading of potential errors of ASR models when converting speech to text. Although FIG. 2 illustrates one example of an out-of-vocabulary search architecture 200, various changes may be made to FIG. 2. For example, although illustrated separately from the ASR model 206 for understanding, the entity prediction model 208 and knowledge base 210 can be integrated within the ASR model 206 to influence hypotheses of the ASR model 206 directly, such that the ASR model 206 itself adjusts probabilities of the ASR output while the output is being formed by providing feedback during operation using the entity prediction model 208 and knowledge base 210. In some embodiments, the entity prediction model 208 and the knowledge base 210 can be separate from the ASR model 206 to perform post processing on outputs from the ASR model 206 to correct entity misrecognitions. In some embodiments, as illustrated in FIG. 2, the inference service 202, ASR model 206, entity prediction model 208, and knowledge base 210 can all be deployed and executed on electronic device 201. In various embodiments, the single entity prediction model 208 and the knowledge base 210 including multiple DAFSAs 212 can be small enough to be completely run on-device. In some embodiments, one or more of the inference service 202, ASR model 206, entity prediction model 208, and knowledge base 210 can be stored and/or executed on a device external to the electronic device 201, such as the server 106. For example, to save memory space, the knowledge base 210 can be stored in an external device and accessed by the controller 205 during a speech recognition task. In general, computing architectures come in a wide variety of configurations, and FIG. 2 does not limit the scope of this disclosure to any particular configuration. In addition, while FIG. 2 illustrates one operational environment in which various features disclosed in this patent document can be used, these features could be used in any other suitable system.

Figure 3:
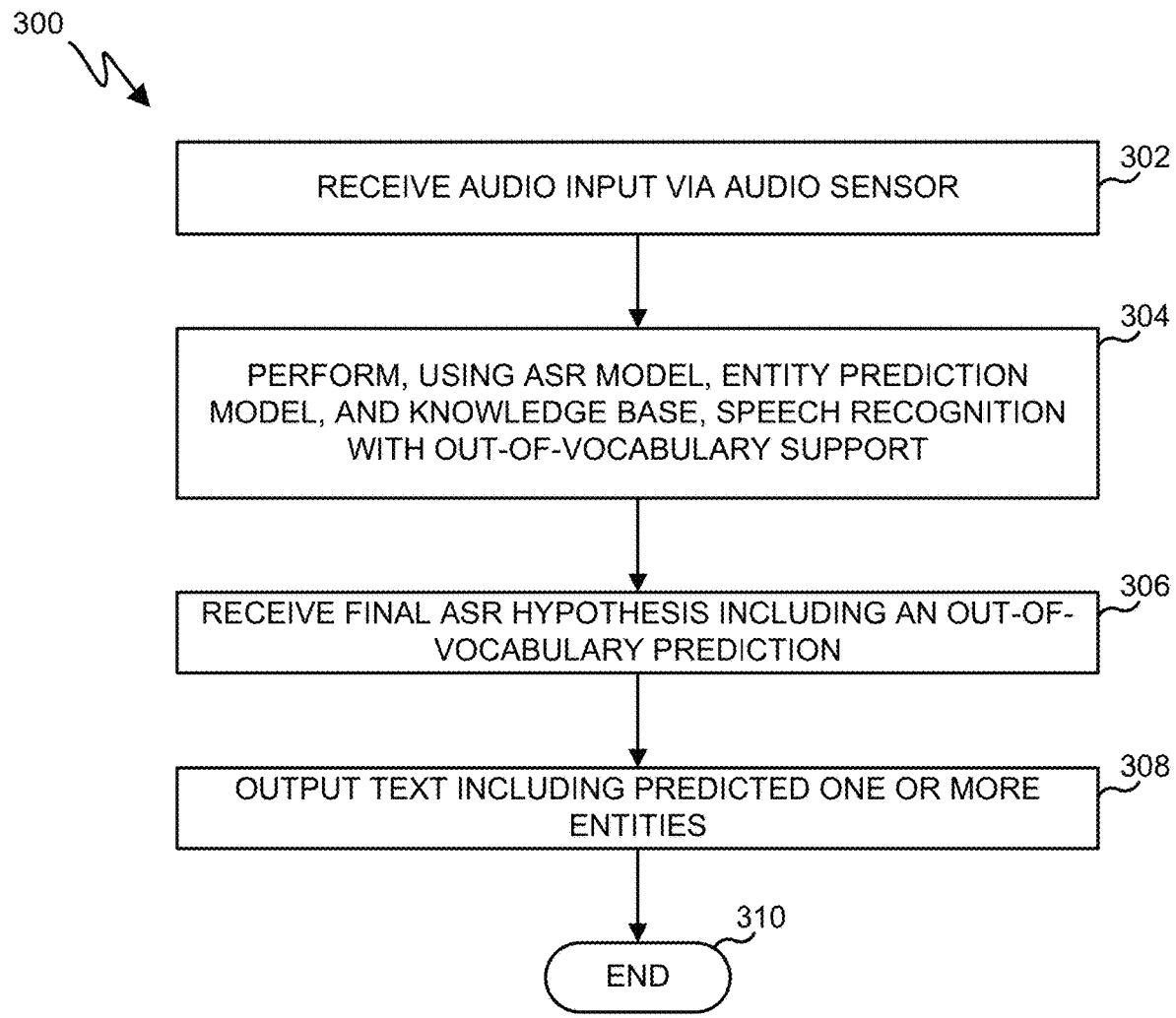
FIG. 3 illustrates an example automatic speech recognition and entity prediction process in accordance with various embodiments of this disclosure.

FIG. 3 illustrates an example ASR and entity prediction process 300 in accordance with various embodiments of this disclosure. For ease of explanation, the process 300 may be described as being executed or otherwise used by the processor(s) 120 of any of the electronic devices 101, 102, 104 or the server 106 in FIG. 1. In some embodiments, the process 300 can be used by the architecture 200 described with respect to FIG. 2. However, the process 300 may be used by any suitable device(s) and in any suitable system.

At block 302, the processor receives an audio input via an audio sensor, such as audio sensor 204. At block 304, the processor, using the ASR model, the entity prediction model, and the knowledge base, performs speech recognition with out-of-vocabulary support. For example, in some embodiments, the processor, via the ASR model, decodes a character or string of characters from the audio input using the ASR model, and the processor provides each character or string of characters to the entity prediction model to determine one or more entity spans and associated domains from the character or string of characters. The processor can score entity candidates, choose candidates based on the scores, and provide one or more ASR hypotheses. A final ASR hypothesis can be determined based on scores or probabilities associated with the ASR hypotheses.

At block 306, the processor receives a final ASR hypothesis of the speech recognition with out-of-vocabulary support performed in block 304. At block 308, the processor outputs text associated with the final ASR hypothesis, which includes one or more predicted out-of-vocabulary entities. Based on the output text, the processor can perform additional tasks using the entity such as playback of music or video, web searches, travel or entertainment booking, or other tasks.

Although FIG. 3 illustrates one example of an ASR and entity prediction process, various changes may be made to FIG. 3. For example, while shown as a series of steps, various steps in FIG. 3 can overlap, occur in parallel, occur in a different order, or occur any number of times. As a particular example, an additional step could be included between block 302 and 304 where the audio input is received by an inference service, such as inference service 202, and passed to the ASR model or the controller. In some embodiments, block 304 can include additional steps for performing the speech recognition with out-of-vocabulary support, as provided in the various embodiments of this disclosure.

Figure 4A:
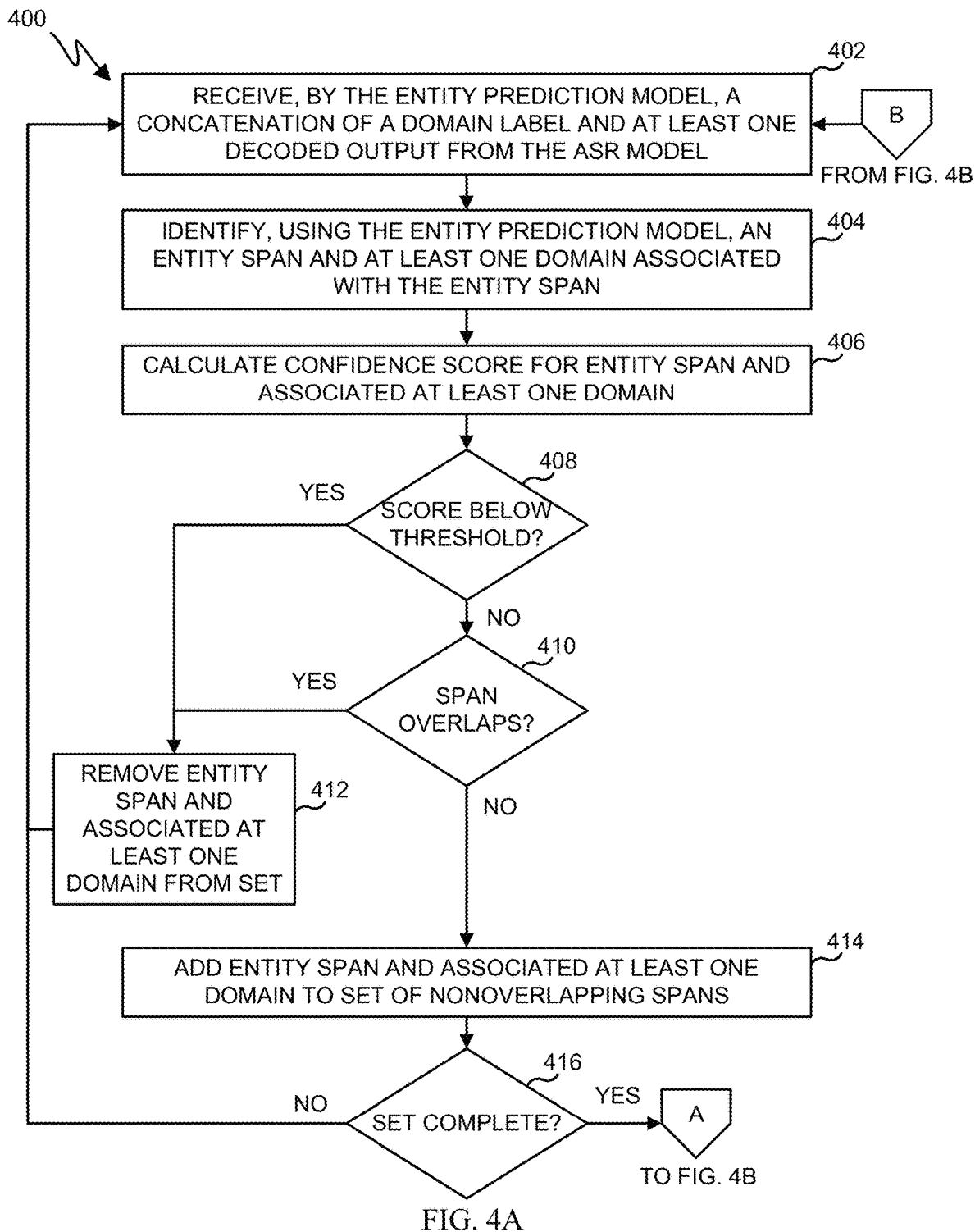
FIGS. 4A and 4B illustrate an example out-of-vocabulary entity prediction process in accordance with various embodiments of this disclosure.
Figure 4B:
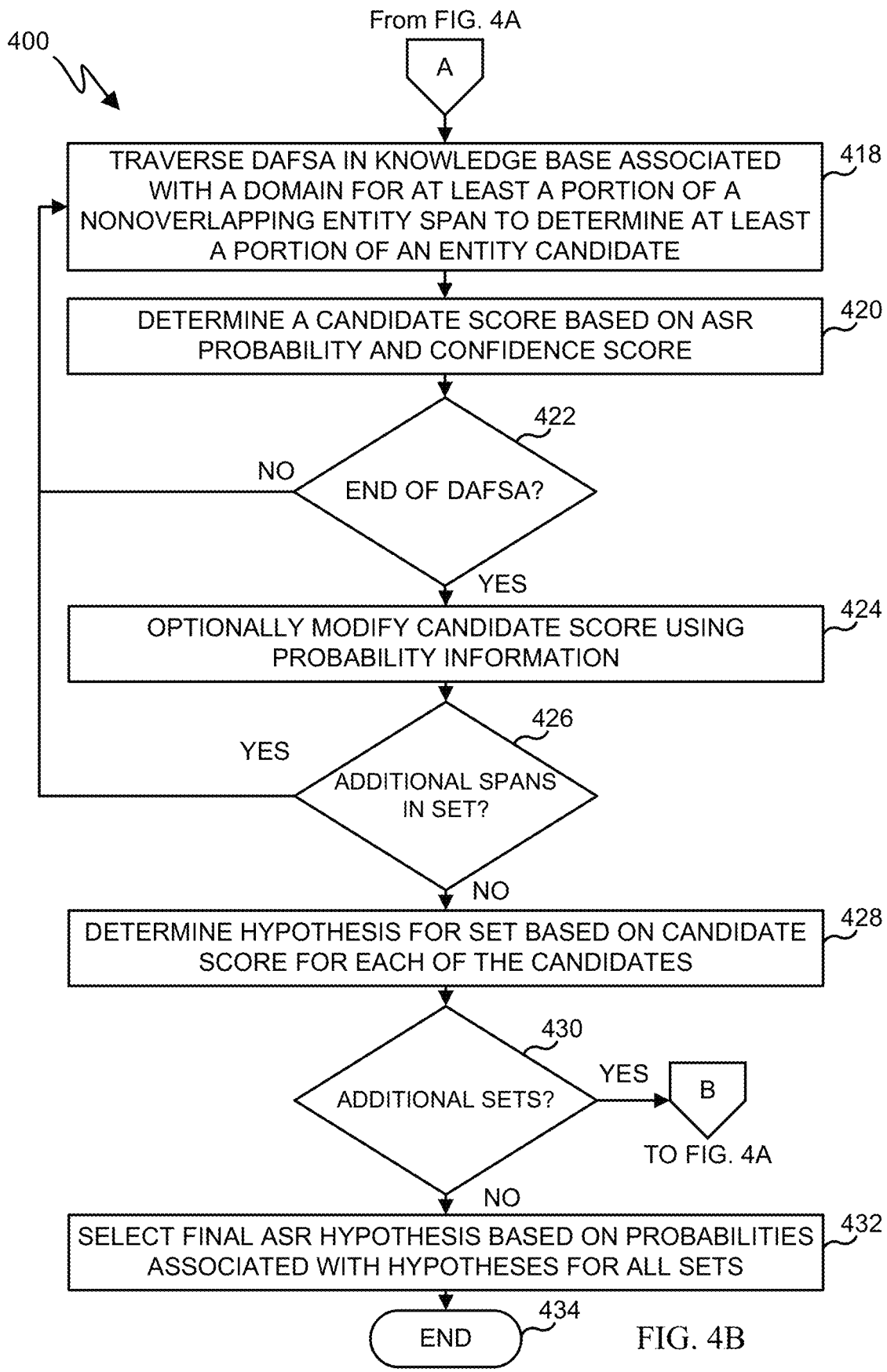

FIGS. 4A and 4B illustrate an example out-of-vocabulary entity prediction process 400 in accordance with various embodiments of this disclosure. For ease of explanation, the process 400 may be described as being executed or otherwise used by the processor(s) 120 of any of the electronic devices 101, 102, 104 or the server 106 in FIG. 1. In some embodiments, the process 400 can be used by the architecture 200 described with respect to FIG. 2. However, the process 400 may be used by any suitable device(s) and in any suitable system. In some embodiments, the process 400 can be comprised within block 304 of FIG. 3.

At block 402, in some embodiments, the processor receives via an entity prediction model, such as the entity prediction model 208, at each time step of a plurality of time steps, a concatenation of a domain label assigned in a previous time step and at least one decoded output from an ASR model, such as the ASR model 206. In some embodiments in which the entity prediction model is a class LM and the current token output by the ASR model was part of an entity span, then the entity prediction model receives the previous label and not the current token. In some embodiments in which the entity prediction model is implemented as a regular expression, the entity prediction model receives the current token, as the regular expression model already keeps track of what parsing choices were carried out so far.

At block 404, the processor, using the entity prediction model, identifies the entity span and at least one domain associated with the entity span. For example, if the processor receives via the ASR model an utterance of "PLAY TOTO," the processor can receive from the ASR model one or more characters of the utterance, such as receiving the first 'T' in "TOTO." The processor can use the output from the ASR model and a domain label determined at a previous time step to predict the entity label to use for the current time step. At block 406, the processor calculates a confidence score for the entity span and the associated at least one domain.

At decision block 408, the processor determines if the confidence score is below a threshold. In some embodiments, the threshold can be a score of zero, or, in some embodiments, the threshold can be a set to a low score. For example, for the utterance "PLAY LOVE SONG BY SARA BAREILLES," spans with confidence scores set to zero could be all sets with "LOVE" as <MOVIE>, because it is followed by literal "SONG," "LOVE" as <TRACK> and "SARA BAREILLES" as <DIRECTOR>, because tracks are done by artists, "LOVE SONG" as <TRACK> or <ALBUM> and "SARA BAREILLES" as <DIRECTOR>, because tracks are done by artists, and "LOVE SONG" as <MOVIE> and "SARA BAREILLES" as <DIRECTOR>, because movies are done by directors. If, at decision block 408, the processor determines that the confidence score is below the threshold, the process 400 moves to block 412. At block 412, the processor removes the low scoring span and domain from a set of spans that are to be used to determine entity candidates. The process 400 then moves back to block 402.

If, at decision block 408, the processor determines that the confidence score is not below the threshold, the process 400 moves to decision block 410. At decision block 410, the processor determines if the span overlaps with other potential spans. The processor can deem overlapping spans invalid or remove the overlapping spans from a set of spans. While the span can be deemed overlapping or invalid for this particular set, other sets of spans can still include the span. For example, a span can be removed from one set of spans in one search path, but that span may remain in other paths. For example, for the utterance "PLAY LOVE SONG BY SARA BAREILLES" spans can be deemed invalid or overlapping where the set of spans includes "LOVE SONG" and "LOVE", or where the set includes "LOVE SONG BY SARA BAREILLES" and "LOVE" or "LOVE SONG" or "SARA BAREILLES." If, at decision block 410, the processor determines that the span overlaps, the process 400 moves to block 412. At block 412, the processor removes the overlapping entity span and/or its associated domain from the set of spans. If, at decision block 410, the processor determines that the span does not overlap, the process 400 moves to block 414. At block 414, the processor adds the entity span and its associated at least one domain to a set of nonoverlapping spans to be used to determine entity candidates for the entity in the utterance.

For example, sets of spans for the utterance "PLAY LOVE SONG BY SARA BAREILLES" with a positive confidence score included in the set of nonoverlapping spans can be: no spans at all, "LOVE" as <TRACK> or <ALBUM>, "LOVE SONG" as <TRACK> or <ALBUM> or <MOVIE>, "SARA BAREILLES" as <ARTIST> or <DIRECTOR>, "LOVE" as <TRACK> and "SARA BAREILLES" as <ARTIST>, "LOVE SONG" as <TRACK> or <ALBUM> and "SARA BAREILLES" as <ARTIST>, "LOVE SONG" as <MOVIE> and "SARA BAREILLES" as <DIRECTOR>, and "LOVE SONG BY SARA BAREILLES" as <TRACK>, <ALBUM> or <MOVIE>.

At decision block 416, the processor determines if the set of spans is complete, that is, the set includes all spans appropriate for the utterance. If not, the process 400 moves back to block 402. If so, the process moves to block 418. In some embodiments, the process 400 may not include blocks 408-416, as the generation of nonoverlapping paths can in various embodiments be a byproduct of the search process in which the entity prediction model outputs a single label at each step for each path of the search in the beam. In such embodiments, no overlapping spans are produced for a single path in the search. It will be understood that the number of search paths to process can depend on a configured size of the beam and the probability computed so far for each path. In some embodiments, a distinct process for generating nonoverlapping spans for sets of spans can be used, and blocks 408-416 can be performed.

At block 418, at a time step, the processor traverses a DAFSA, such as DAFSA 212, in a knowledge base, such as knowledge base 210, associated with the previously determined domain for at least a portion of a nonoverlapping span to determine at least a portion of an entity candidate. For example, for the utterance with a ground truth of "PLAY TOTO" the processor could predict using the ASR model and the entity prediction model that a <MUSIC> DAFSA and/or a <MOVIE> DAFSA are to be traversed based on the previous verb "PLAY." Each DAFSA can include a plurality of strings, and the processor traverses the DAFSA at block 418 to constrain the subsequent ASR output.

At block 420, the processor determines a candidate score for the at least a portion of the entity candidate provided for an ASR output constrained by the DAFSA. For example, if the DAFSA includes based on a traversal at a timestamp the letter 'B', the ASR output is constrained to the letter 'B'. The processor via the ASR model assigns an ASR probability to the letter 'B' based on the probability that the ASR model would have normally selected for 'B'. In various embodiments, the confidence score is a probability of the predicted label or domain based on prior ASR output. In various embodiments, the candidate score is a combination of the ASR probability and the confidence score. The two probabilities can be combined in various ways, such as by multiplying the two probabilities together or calculating a weighted average for the probabilities. In some embodiments, a best candidate for the span is selected either at the time of each DAFSA traversal, such as after block 420, or after a full entity candidate is determined, such as after block 424, or at block 428 as described herein. A candidate can be a single character or an entire word determined for a portion of an utterance.

At decision block 422, the processor determines if the end of the DAFSA is reached. If not, the process 400 moves back to block 418. If so, the process 400 moves to block 424. At block 424, the processor can optionally modify one or more candidate scores for an entity using probability information. For example, if, for an utterance including a command to call a contact, a full entity name of "Bob" is identified, the processor can obtain user probability information from the knowledge base for the candidate, such as the frequency at which the user calls Bob. If the frequency is low based on past user history, the candidate score or scores can be reduced. If the frequency is high, the candidate score or scores can be unaltered or increased. In some embodiments, when determining candidates a character at a time, either each individual candidate score can be modified in block 424, or the processor can generate a single candidate score for the entity by combining each score for each character. The combined score can then be modified in block 424. User probability information can include general user data, such as demographics, user preferences, or user context, such as current user global positioning system (GPS) location. Other probability information can include non-user information, such as popularity metrics for certain terms according to a domain, such as tracking a number of web searches for an entity.

At decision block 426, the processor determines if there are additional spans in the set of nonoverlapping spans from which to determine entity candidates for those additional spans. If so, the process 400 moves back to block 418. If not, the process 400 moves to block 428. At block 428, the processor determines an ASR hypothesis for the set of spans that includes a full potential output for the utterance. In some embodiments, the processor determines the hypothesis at block 428 based on the candidate scores for each candidate determined at blocks 418-426. In some embodiments, the candidates can be determined earlier in the process 400, such as at each timestep during traversal of the DAFSA. In such embodiments, at block 428, the processor can simply assemble the full utterance hypothesis based on the selected candidate(s) for each span. The process 400 then moves to decision block 430, in which the processor determines if additional sets of spans are to be searched. If so, the process moves back to block 402 to determine a hypothesis for another set of spans.

If, at decision block 430, the processor determines all sets have been processed, the process 400 moves to block 432. At block 432, the processor determines a final ASR hypothesis using the candidate scores for each of the hypotheses determined at block 428, such as choosing the hypothesis with the highest overall probability, the argmax of the probabilities for all hypotheses, for instance. The text created from the audio data including the final determined entity can then be output from the ASR model for use by other applications. The process 400 ends at block 434.

Although FIGS. 4A and 4B illustrate one example of an out-of-vocabulary entity prediction process, various changes may be made to FIGS. 4A and 4B. For example, while shown as a series of steps, various steps in FIGS. 4A and 4B can overlap, occur in parallel, occur in a different order, or occur any number of times. As a particular example, low scoring spans determined to be below the threshold at decision block 408 can be included in the set of nonoverlapping spans, allowing the ASR model and the entity prediction model to take the low confidence score into account when determining a final result for the entity. As another example, the traversal of the DAFSA in blocks 418-430 can be performed in parallel with the domain identification in blocks 402-414. In some embodiments, the entity prediction model can be a look up table or other similar structure in which each possible domain label is looked up based on the utterance, such as looking up <MOVIE> and <MUSIC> labels for a term following an verb such as "PLAY." The DAFSA then could be consulted for each looked up label.

Figure 5:
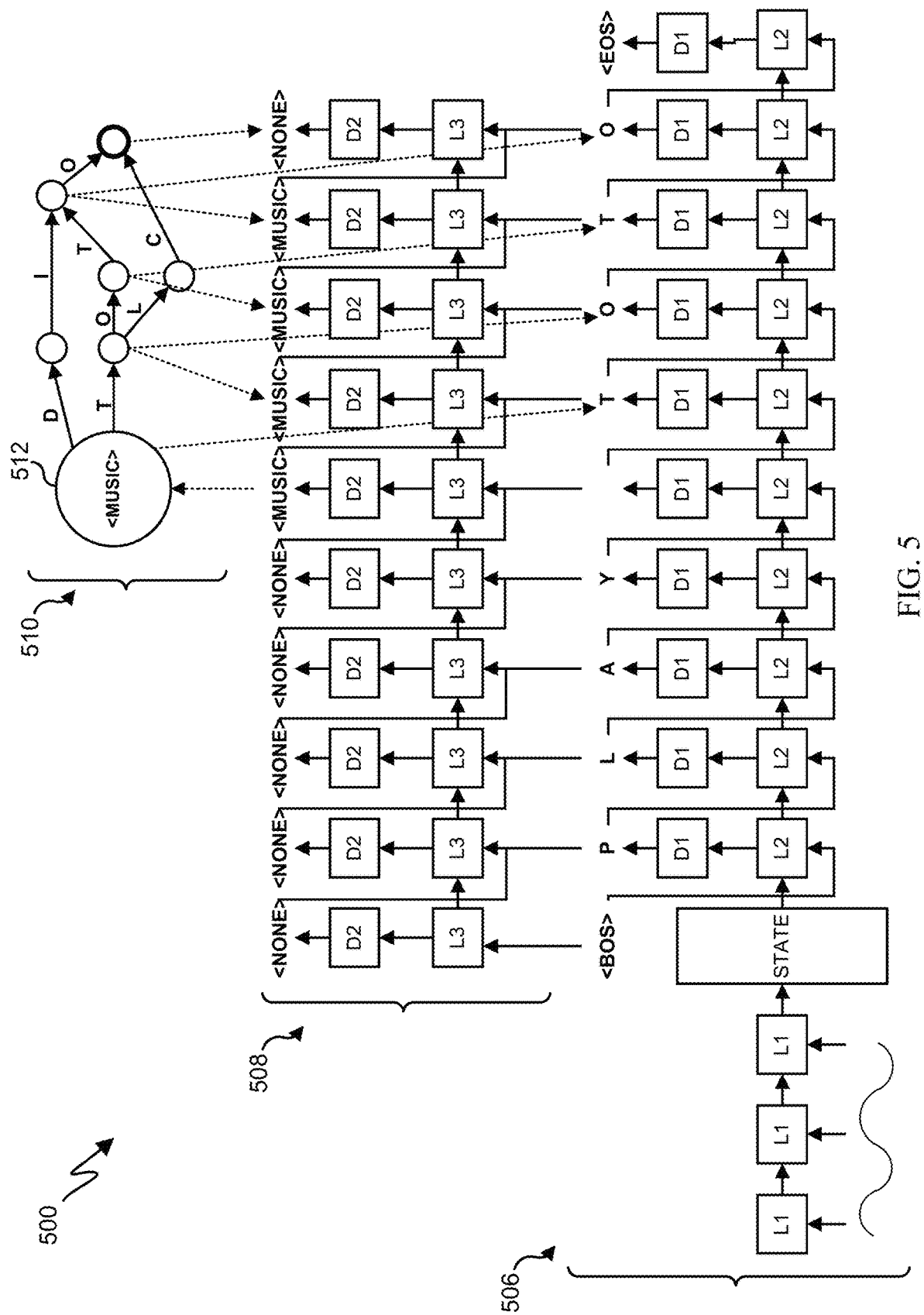
FIG. 5 illustrates an example neural out-of-vocabulary searching architecture in accordance with various embodiments of this disclosure.

FIG. 5 illustrates an example neural out-of-vocabulary searching architecture 500 in accordance with various embodiments of this disclosure. For ease of explanation, the architecture 500 may be described as being executed or otherwise used by the processor(s) 120 of any of the electronic devices 101, 102, 104 or the server 106 in FIG. 1. In some embodiments, the architecture 500 can be included in the architecture 200 described with respect to FIG. 2. However, the architecture 500 may be used by any suitable device(s) and in any suitable system.

The example illustrated in FIG. 5 integrates into an ASR model 506 an entity prediction model 508 and a knowledge base 510 to provide that the ASR model itself adjusts probabilities of the ASR output while the output is being formed by providing feedback during operation. The ASR model 506 and the entity prediction model 508 work together at each time step to predict ASR output tokens and domain labels for each token. As illustrated in FIG. 5, the ASR model 506 and the entity prediction model 508 can be deep learning models, such as LSTM models. The knowledge base 510 includes one or more compiled DAFSAs 512, each associated with a particular domain label. The ASR model 506 can include an end-to-end ASR encoder-decoder architecture, while the entity prediction model 508 can be a custom entity prediction sequence labeling architecture with a recurrent neural network taking as input at every time step the concatenation of the label assigned in the previous time step and the current ASR output token. As illustrated in the example of FIG. 5, a token is a character, and the label assigned to it refers to the domain of the entity following it. For example, in FIG. 5 the processor labels the space character as <MUSIC> because, based on the previous context "PLAY," what comes after the space character can be an entity in the music domain.

As illustrated in the example of FIG. 5, for an utterance "PLAY TOTO", the audio input is processed by one or more LSTM layers L1 to provide a beginning of sentence <BOS> state. The <BOS> output is fed to both the first layer of a next set of LSTM layers L2 in the ASR model 506 and a first layer of a set of LSTM layers L3 in the entity prediction model 508. The L2 layers each provide outputs to a next L2 layer and to a dense layer D1. Each dense layer D1 outputs a token making up a portion of the utterance, such as one character. Each of the LSTM layers L2 in the ASR model 506 receive as inputs the output from the previous L2 layer and the token from the previous D1 layer. Each L3 layer in the entity prediction model 508 receives as inputs the output from the previous L3 layer and an entity label from a previous dense layer D2 layer of the entity prediction model 508, and a token from a corresponding dense layer D1 of the ASR model 506.

As illustrated in FIG. 5, after the processor predicts the beginning of an entity, such as predicting after "PLAY" that the entity is in the <MUSIC> domain, the processor can traverse the <MUSIC> DAFSA 512 in the knowledge base 510, which can be performed in parallel to the decoding and labeling until a final state in the DAFSA 512 is achieved. In various embodiments of this disclosure, the traversal of the DAFSA 512 and the decoding using the ASR model 506 influence each other because, at every time step, the output from ASR model 506 is constrained to the set of characters on the current state's fan-out in the traversal of the DAFSA 512, and the traversal's next state can be chosen based on the actual ASR decoder output. The sequence labeler of the entity prediction model 508 is also constrained to output the same domain repeatedly throughout the traversal. Upon reaching the final state in the DAFSA, the processor provides an entity candidate for the out-of-vocabulary word or phrase in a span. Upon reaching an end of sentence <EOS> an ASR hypothesis is provided. For the spans in each set of spans, the processor can provide multiple entity candidates, and, based on the probabilities associated with each candidate, the processor determines a full hypothesis for the set of spans. The processor can process other sets of spans, i.e., other decoding paths or other hypotheses in the beam until the processor reaches a hypothesis for each set of spans. The processor can then determine a final ASR hypothesis selected from the hypotheses for the sets of spans. In some embodiments, candidates are discarded based on candidate scores while processing a set of spans to provide a single full hypothesis for that particular set of spans. In some embodiments, depending on processing and memory resources available, the processor can generate multiple full hypotheses from a single set of spans, with the hypotheses each including one or more alternative candidates. The processor then selects a final ASR hypothesis from all generated hypotheses of all the sets. In some embodiments, the final ASR hypothesis is determined by the argmax of the probabilities associated with the hypotheses.

In some embodiments, the knowledge base 510 can include entity popularity information based on user-agnostic information or information specific to a particular user. Entity popularity can be used to weigh or modify scores assigned by the ASR model 506 and the entity prediction model 508. For example, a score for a candidate "MICHAEL JACKSON" can be weighted higher than a score of candidate "MIKE JACKSON" because artist Michael Jackson is more popular than artist Mike Jackson. If user-specific information is available in the knowledge base 510, it can also be used to weight the candidates and their domains. For example, if a user has been listening to, or has otherwise expressed interest in, artist Mike Jackson a lot more than artist Michael Jackson, then the processor can weigh or modify scores accordingly. If a user has been listening to, or has otherwise expressed interest in, children's music more than pop, then the processor can apply the weights of children's music artist Mike Jackson and pop artist Michael Jackson accordingly. If a user is interacting with a smart TV, the processor can weight scores for spans with the label of <FILM> higher than scores for spans with a label of <MUSIC>. If a user is currently located in Andalusia, Spain, the processor can weigh a score of candidate "GRANADA" higher than a score of candidate "GRENADA" because Granada is a city and province in Andalusia, Spain, whereas "GRENADA" is a country in the Caribbean. In some embodiments, the knowledge base 510 can also include information about entity relations. Entity relation information can be used to filter out unlikely combinations of entities at runtime. For instance, "PLAY THERE WAS A PRINCESS LONG AGO BY MICHAEL JACKSON" is a worse hypothesis than "PLAY THERE WAS A PRINCESS LONG BY MIKE JACKSON" because artist Michael Jackson never sang the song.

At every time step in the decoding, the paths that can be taken may not be based on the probability distribution of tokens alone, but rather of token-category pairs, including the category <NONE>. For instance, at every time step the probability of tokens coming from the ASR model 506 are weighted by probabilities of categories coming from the entity prediction model 508, creating as many possible paths as the number of tokens multiplied by the number of categories, such as num_tok*num_cats. When based on the FSA database it is determined that some token-category paths are impossible for that time step, their probabilities can be zeroed out. The end result of this approach is that if, for certain spans of text, the ASR model 506 is confident of its own unconstrained hypotheses, such as <NONE> category subpaths, then those will be output. Otherwise, entities from a known database will be output, such as specific category subpaths. The architecture 500 allows for predictions conditioned not only on input context, such as previous characters output by the ASR model 506, but also output context, such as the previous labels output by the entity prediction model, with a dense layer suitable for online constrained decoding. The architecture 500 can be used with any type of neural existing ASR system, including complex models using attention layers, such as transformer architectures, or systems including a domain-independent language model.

Although FIG. 5 illustrates one example of a neural out-of-vocabulary searching architecture 500, various changes may be made to FIG. 5. In some embodiments, the overall algorithm executed by the processor using the architecture 500 can be greedy, in that the ASR model 506 and the entity prediction model 508, at every time step, output the best alternative available to them. This can be equivalent to a beam of size 1, but larger beams can instead be used, as modern processors such as GPUs can efficiently process multiple alternatives in batch. In some embodiments, when using a larger beam size, the policy metric used by the processor to select the most promising alternatives at every time step is the joint probability of a sequence of characters from the ASR model 506 and their labels representing spans and domains from the entity prediction model 508. This can improve the accuracy, because sometimes choosing the most probable output for a single time step (local optimum) does not lead to the decoding of the overall most probable sequence (global optimum). For the purposes of illustration, FIG. 5 uses a character-based ASR vocabulary, but the vocabulary of some production systems can be enhanced with frequent sub-word units derived from training data. Likewise, training the ASR model 506 to predict labels at word-level enables the use of word embeddings derived from pre-trained systems, such as Bidirectional Encoder Representations from Transformers (BERT), which increases the overall system's accuracy. In order to accommodate for these enhancements and the reuse of systems with different levels of input and output granularity, an adapter, such as a buffer can be introduced between the ASR model 506 and the entity prediction model 508, which keeps track of the alignment between outputs of the ASR model 506 and inputs of the entity prediction model 508, and is responsible for building up or breaking down outputs from the ASR model 506 to the granularity used by the interface of the entity prediction model 508. In some embodiments, masking named entities in the training data, such as replacing the training data by a standard token, can be used to maximize the learning rate of the entity prediction model 508 per sample and to prevent overfitting.

In some embodiments, the ASR model 506 and the entity prediction model 508 can be trained independently. In some embodiments, prosody can contain valuable information to identify the presence and span of out-of-vocabulary phrases in speech utterances. To make use of it, the processor can also concatenate the ASR model decoder's hidden state to the input of the sequence labeler in the entity prediction model 508. In such an embodiment, the ASR model 506 and the entity prediction model 508 are trained jointly as a multi-task architecture. For purpose of illustration, FIG. 5 depicts one DAFSA 512, but in various embodiments the architecture 500 can handle multiple domains each encoded by its own DAFSA 512, and multiple DAFSAs 512 can be traversed while decoding a single utterance, for example "PLAY AFRICA BY TOTO" where "AFRICA" is a <TRACK> and "TOTO" is an <ARTIST>, or "BUY TICKETS FOR MICHAEL JACKSON IN LAS VEGAS" where "MICHAEL JACKSON" is an <ARTIST> and "LAS VEGAS" is a <PLACE>. Traversal of a DAFSA is linear in the length of the input regardless of how big the DAFSA is, so expanding the number of domains or entities stored for each domain will not affect the decoding time. In general, computing architectures come in a wide variety of configurations, and FIG. 5 does not limit the scope of this disclosure to any particular configuration. In addition, while FIG. 5 illustrates one operational environment in which various features disclosed in this patent document can be used, these features could be used in any other suitable system.

Figure 6:
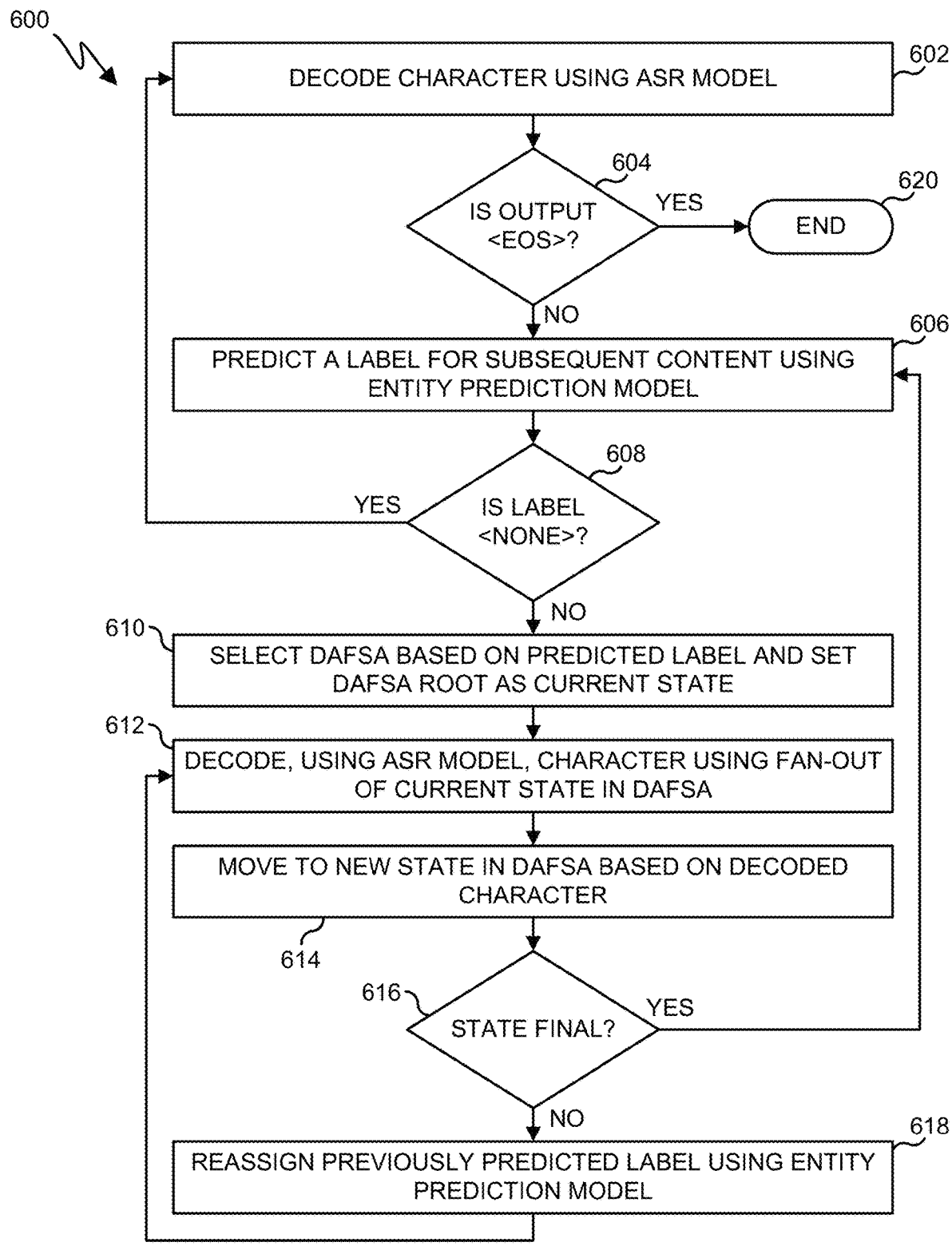
FIG. 6 illustrates an example out-of-vocabulary searching process in accordance with various embodiments of this disclosure.

FIG. 6 illustrates an example out-of-vocabulary searching process 600 in accordance with various embodiments of this disclosure. For ease of explanation, the process 600 may be described as being executed or otherwise used by the processor(s) 120 of any of the electronic devices 101, 102, 104 or the server 106 in FIG. 1. In some embodiments, the process 600 can be used by the architecture 200 or the architecture 500 described with respect to FIG. 2 and FIG. 5, respectively. However, the process 600 may be used by any suitable device(s) and in any suitable system.

At block 602, the processor decodes a character using an ASR model, such as the ASR model 506. At decision block 604, the processor determines if the character output at block 602 is an end of sentence <EOS> token. If so, the process 600 ends at block 620. If not, the process 600 moves to block 606. At block 606, the processor predicts a label for subsequent content using an entity prediction model, such as entity prediction model 508. For example, as illustrated in FIG. 5, at each time step the entity prediction model 508 predicts a label for the token for the next time step.

At decision block 608, the processor determines if the label predicted at block 606 is <NONE>. If so, the process 600 moves back to block 602 to decode a next character using the ASR model. If not, the process 600 moves to block 610. At block 610, the processor selects a DAFSA from the knowledge base to traverse based on the label predicted at block 606, and the processor sets the root of the DAFSA as the current state. For example, as shown in FIG. 5, when the space character between "PLAY" and "TOTO" is processed, the entity prediction model 508 predicts the label for the next token to be <MUSIC>, selects the <MUSIC> DAFSA from the knowledge base 510, and sets the root of the <MUSIC> DAFSA as the current state.

At block 612, the processor decodes, using the ASR model, a next character in the utterance using a fan-out of the current state in the DAFSA selected in block 610. At block 614, the processor moves to a new state in the DAFSA based on the character decoded in block 612. At decision block 616, the processor determines if the new state set in block 614 is a final state for the DAFSA. If not, the process 600 moves to block 618. At block 618, the processor reassigns the previously predicted label using the entity prediction model. For example, as shown in FIG. 5, at each time step in which the <MUSIC> DAFSA is traversed, the entity prediction model 508 assigns the <MUSIC> label to the next layer. After block 618, the process 600 loops back to block 612 to decode the next character using the fan-out of the current state in the DAFSA. If, at decision block 616, the processor determines that the state set in block 614 is a final state for the DAFSA, the process 600 loops back to block 606 to predict a next label. The process ends at block 620 upon reaching the <EOS> token.

Although FIG. 6 illustrates one example of an out-of-vocabulary entity prediction process, various changes may be made to FIG. 6. For example, while shown as a series of steps, various steps in FIG. 6 can overlap, occur in parallel, occur in a different order, or occur any number of times. As a particular example, the process 600 executed by the processor can be greedy, in that the ASR model and the entity prediction model, at every time step, output the best alternative available to them. This can be equivalent to a beam of size 1, but larger beams can instead be used, as modern processors such as GPUs can efficiently process multiple alternatives in batch. In some embodiments, when using a larger beam size, the policy metric used by the processor to select the most promising alternatives at every time step is the joint probability of a sequence of characters from the ASR model and their labels representing spans and domains from the entity prediction model. This can improve the accuracy, because sometimes choosing the most probable output for a single time step (local optimum) does not lead to the decoding of the overall most probable sequence (global optimum). In some embodiments, masking named entities in the training data, such as replacing the training data by a standard token, can be used to maximize the learning rate of the entity prediction model per sample and to prevent overfitting. In some embodiments, prosody can contain valuable information to identify the presence and span of out-of-vocabulary phrases in speech utterances. To make use of it, the processor can also concatenate the ASR model decoder's hidden state to the input of the sequence labeler in the entity prediction model. In various embodiments the process 600 can also handle multiple domains each encoded by its own DAFSA, and multiple DAFSAs can be traversed while decoding a single utterance.

Figure 7:
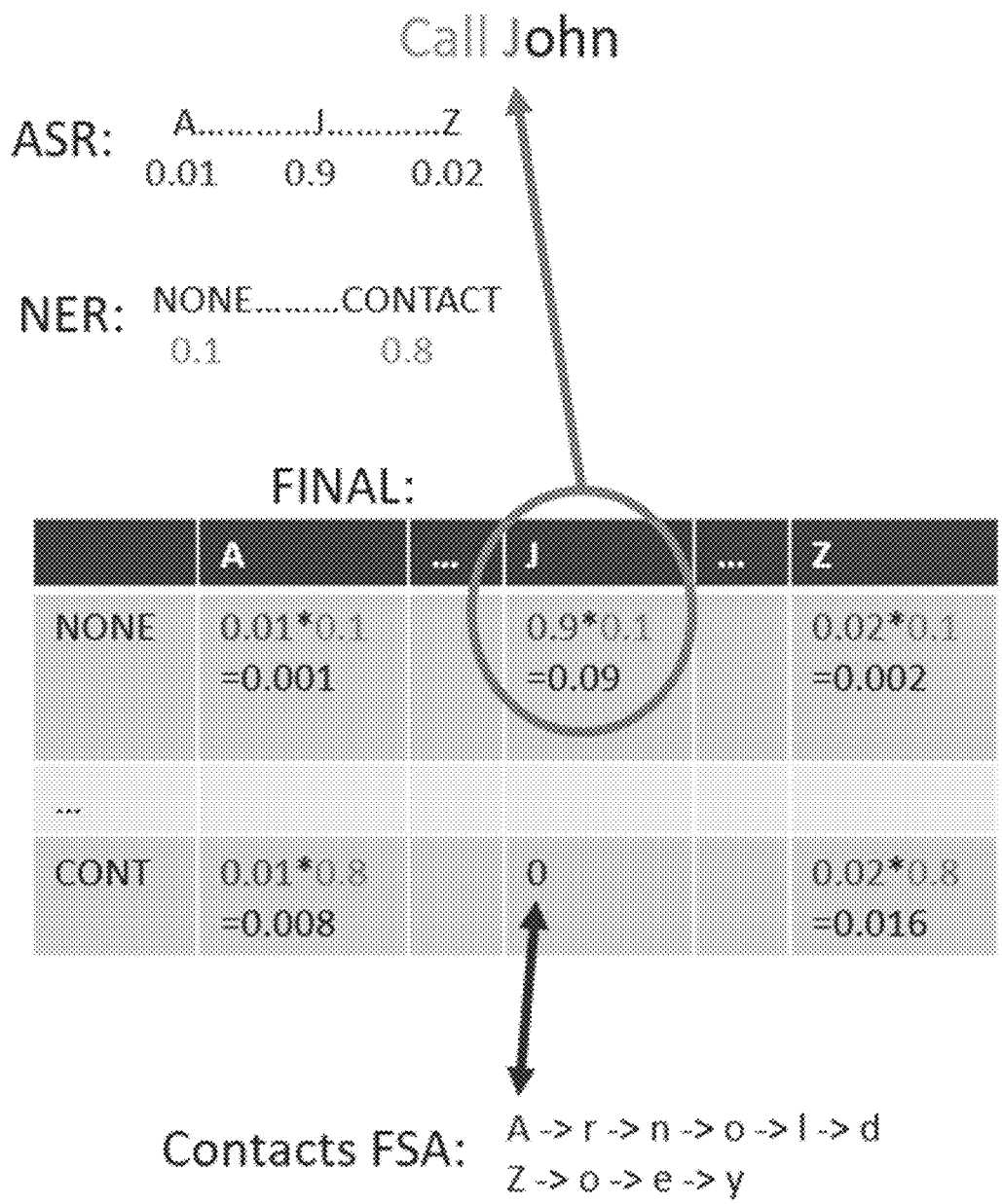
FIG. 7 illustrates an example automatic speech recognition model deference process in accordance with various embodiments of this disclosure.

FIG. 7 illustrates an example ASR model deference process 700 in accordance with various embodiments of this disclosure. For ease of explanation, the process 700 may be described as being executed or otherwise used by the processor(s) 120 of any of the electronic devices 101, 102, 104 or the server 106 in FIG. 1. In some embodiments, the process 700 can be used by the architecture 200 or the architecture 500 described with respect to FIG. 2 and FIG. 5, respectively. However, the process 700 may be used by any suitable device(s) and in any suitable system.

At every time step in the decoding, the paths that can be taken may not be based on the probability distribution of tokens alone, but rather of token-category pairs, including the category <NONE>. For instance, at every time step the probability of tokens coming from the ASR model, such as ASR model 506, are weighted by probabilities of categories coming from the entity prediction model, creating as many possible paths as the number of tokens multiplied by the number of categories, such as num_tok*num_cats. When based on the FSA database it is determined that some token-category paths are impossible for that time step, their probabilities can be zeroed out. The end result of this approach is that if, for certain spans of text, the ASR model is confident of its own unconstrained hypotheses, such as <NONE> category subpaths, those will be output. Otherwise, entities from a known database will be output, such as specific category subpaths.

In the example illustrated in FIG. 7, the user utterance is "Call John" and the processor using the ASR decoder has already output the string "Call." The processor, using the ASR model, determines the next letter has a 0.9 probability to be T while the probability for other letters is much lower, such as 0.01 for A and 0.02 for Z. Based on the previous output "Call", the processor, using the entity prediction model, such as the entity prediction model 508, determines the next label or category has 0.8 probability to be <CONTACT> while the probability for other classes is much lower, such as 0.1 for <NONE>. The probability of all possible letter-category pairs can be calculated such as by multiplication or a weighted average, of the probabilities received from the ASR model and the entity prediction model. For example, as illustrated in FIG. 7, the processor multiplies the probability from the ASR model for the token and the probability from the entity prediction model for the category to get a single probability.

In some embodiments, the pairs which according to the database or knowledge base are impossible can be assigned a 0 probability. For example, if the <CONTACT> DAFSA is not traversable with 'J' then the probability for the category provided by the entity prediction model can be set to zero. However, in some cases, the processor can defer to the ASR model where the ASR model has a high confidence in order to prevent overcorrecting possible correct results into different incorrect results. For example, even if pair J-CONTACT is impossible according to the <CONTACTS> FSA, and the overall probability of category NONE is very low, the overall probability of letter J is high enough that the probability of pair J-NONE is still the highest. The processor thus chooses letter J, deferring to the ASR model. If John were not in the domain to be corrected after the ASR output, the text could be overcorrected into a different name that is not necessarily one from the user phonebook or contacts list.

Figure 8:
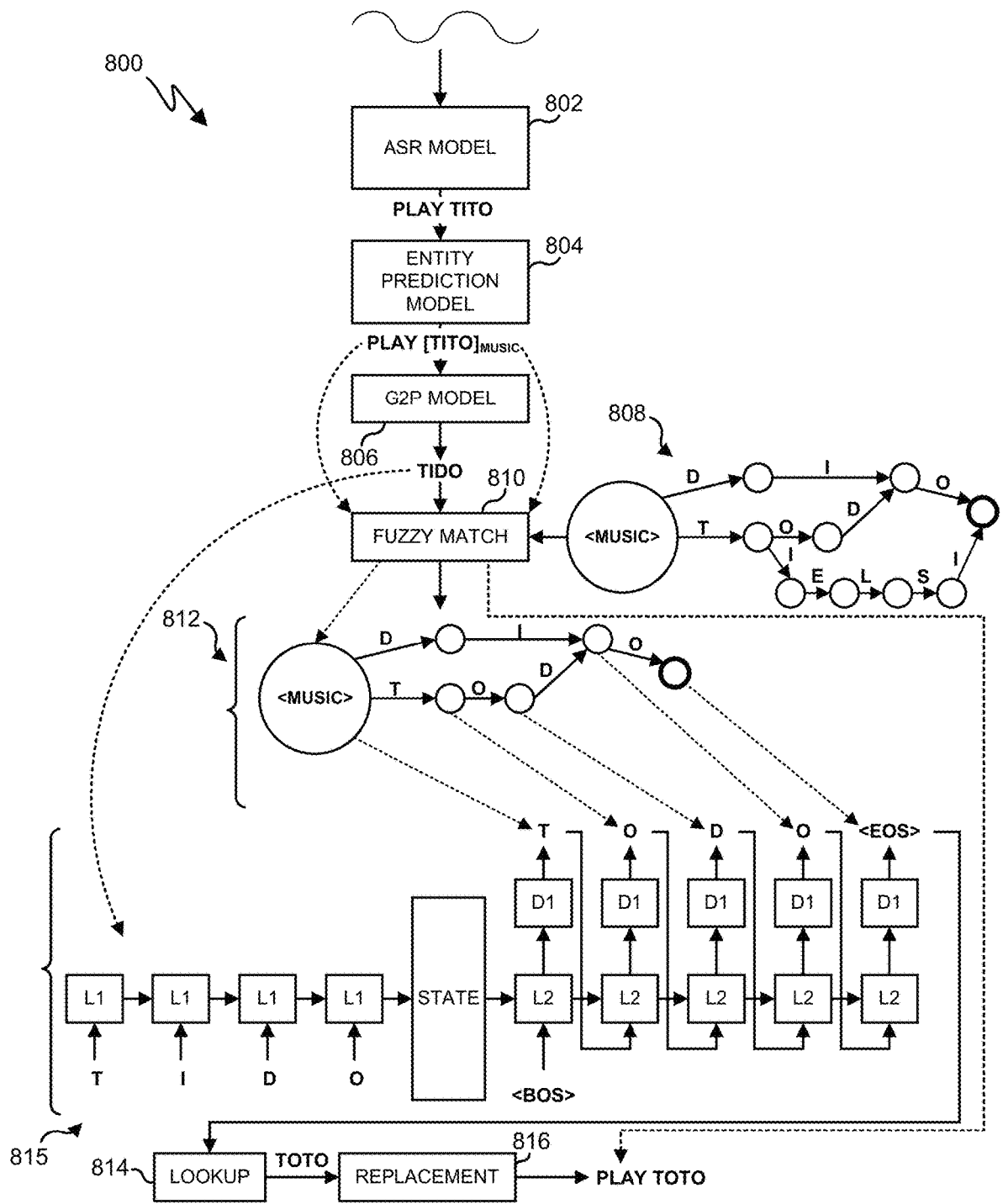
FIG. 8 illustrates a post processing entity misrecognition correction architecture in accordance with various embodiments of this disclosure.

FIG. 8 illustrates a post processing entity misrecognition correction architecture 800 in accordance with various embodiments of this disclosure. For ease of explanation, the architecture 800 may be described as being executed or otherwise used by the processor(s) 120 of any of the electronic devices 101, 102, 104 or the server 106 in FIG. 1. In some embodiments, the architecture 800 can be included in the architecture 200 described with respect to FIG. 2. However, the architecture 800 may be used by any suitable device(s) and in any suitable system.

In the example of FIG. 8, the processor, via an ASR model 802, provides an initial hypothesis, such as "PLAY TITO" in this example. The processor provides the hypothesis to an entity prediction model 804. Since the hypothesis is provided first by the ASR model 802, the entity prediction model 804 can be a model operating on full utterances, either based on machine learning, such as a sequence labeling network or a pointer network or rules, such as a finite state transducer or parser. To assist with the task of entity prediction by the entity prediction model due to the possible loss at the ASR level of information of the rich audio source, the processor can run both the misrecognitions at runtime and all the out-of-vocabulary phrases in a DAFSA 808 at compile time through a grapheme-to-phoneme (G2P) model 806 that outputs phonetic transcriptions. For example, as illustrated in FIG. 8, the G2P model 806 provides a phonetic transcription of "TIDO." A neural machine translation (NMT) encoder-decoder model 815 is trained with pairs including an entity misrecognition and a respective ground truth. During training, the model 815 effectively learns to translate from an ASR misrecognition to the correct out-of-vocabulary phrase, but at inference time the model can instead be used to score relevant DAFSA paths in the DAFSA 808 conditioned on the misrecognition. In this example, the NMT encoder-decoder model 815 is fed a textual ASR misrecognition instead of an audio wave, and no portion of the decoding process is unconstrained.

To reduce the risk of the model scoring wrong candidates higher than the correct one, the architecture 800 includes a fuzzy match 810 performed by the processor for performing a fast fuzzy search using a deterministic algorithm, such as a Universal Levenshtein Automaton, to filter out from the set of candidates all entries that are at an edit distance higher than a predefined maximum from the misrecognition, providing a second DAFSA 812. Since architecture 800 provides a phonetic transcription, the processor can perform a lookup 814 to get the source string that will replace the ASR misrecognition at block 816. The lookup can be carried out, among other ways, as an exact search because the output of the constrained decoding is to be an entity from the first DAFSA 808.

Although FIG. 8 illustrates one example of a post processing entity misrecognition correction architecture, various changes may be made to FIG. 8. For example, the processor can also use optional information in the DAFSA 808 or in the lookup 814 to weight scores of candidates and span labels differently, or filter out unlikely combinations. In some embodiments, the entity prediction model 804 can output multiple hypotheses, in which case the metric used by the processor to select the final result can be the joint probability of a labeling and decoding sequence. In some embodiments, a rule-based labeling can be used in a case in which each sequence of labels has the same probability. In general, computing architectures come in a wide variety of configurations, and FIG. 8 does not limit the scope of this disclosure to any particular configuration. In addition, while FIG. 8 illustrates one operational environment in which various features disclosed in this patent document can be used, these features could be used in any other suitable system.

Although this disclosure has been described with example embodiments, various changes and modifications may be suggested to one skilled in the art. It is intended that this disclosure encompass such changes and modifications as fall within the scope of the appended claims.

What is claimed is:

1. An electronic device comprising:
an audio sensor;
a buffer;
a memory; and
at least one processor coupled to the audio sensor and the memory, wherein the at least one processor is configured to:
  receive, via the audio sensor, an audio input;
  perform, using an automatic speech recognition (ASR) machine learning model and an entity prediction machine learning model, an out-of-vocabulary prediction of an entity, wherein the ASR machine learning model and the entity prediction machine learning model are jointly-trained as a multi-task architecture, wherein the buffer is configured to track alignment of outputs from the ASR machine learning model and inputs of the entity prediction machine learning model, and wherein, to perform the out-of-vocabulary prediction of the entity, the at least one processor is configured, using the ASR machine learning model and the entity prediction machine learning model, to:
    predict a domain label for at least a portion of the audio input;
    select, using the predicted domain label, a preexisting domain-specific deterministic acyclic finite state automaton (DAFSA) for the predicted domain label from a knowledge base including a plurality of preexisting domain-specific DAFSAs;
    determine, at each time step of a plurality of time steps using the selected pre-existing domain-specific DAFSA from the knowledge base, a portion of a candidate for the entity;
    assign, at each time step, an intermediate candidate score for each portion of the candidate determined using the selected pre-existing domain-specific DAFSA, wherein the intermediate candidate score is a combination of an ASR machine learning model score and an entity prediction machine learning model score; and
    determine a final candidate score for the candidate based on a combination of the intermediate candidate score for each portion of the candidate;
  receive, based on the final candidate score, an ASR hypothesis including the predicted entity; and
  output text including the predicted entity.

2. The electronic device of claim 1, wherein, to perform the out-of-vocabulary prediction of the entity, the at least one processor is further configured to:
- decode one or more portions of the audio input using the ASR machine learning model;
- predict the domain label for a subsequent portion of the audio input based on the one or more decoded portions of the audio input;
- retrieve, for the predicted domain label using the knowledge base, a plurality of candidates for the entity;
- determine the final candidate score for each of the plurality of candidates; and
- select one of the plurality of candidates based on the final candidate score for each of the plurality of candidates.

3. The electronic device of claim 2, wherein, to retrieve the plurality of candidates, the at least one processor is configured to:
- traverse, at each time step, the DAFSA for the predicted domain label; and
- determine, at each time step, at least one portion of one of the plurality of candidates based on the traversal of the DAFSA.

4. The electronic device of claim 2, wherein, to receive the ASR hypothesis, the at least one processor is configured to:
- determine one or more ASR hypotheses for the audio input, wherein at least one of the ASR hypotheses is based on the selected candidate; and
- select the ASR hypothesis from the one or more ASR hypotheses based on probabilities associated with the one or more ASR hypotheses.

5. The electronic device of claim 2, wherein the at least one processor is further configured to identify, using the entity prediction machine learning model, nonoverlapping spans of entities in a set of spans and at least one domain associated with each of the nonoverlapping spans of entities.

6. The electronic device of claim 5, wherein, to identify the nonoverlapping spans of entities, the at least one processor is configured to:
- assign, using the entity prediction machine learning model, a confidence score for each span; and
- remove from consideration one or more spans from the set of spans based on a determination that the confidence score for each of the one or more spans is below a threshold.

7. The electronic device of claim 2, wherein the at least one processor is further configured to modify the final candidate score for at least one of the plurality of candidates based on probability information including at least one of: candidate popularity, user information, user preferences, user context, and user utterance history.

8. A method for out-of-vocabulary phrase support in automatic speech recognition (ASR) comprising:
- receiving, via an audio sensor of an electronic device, an audio input;
- performing, by at least one processor of the electronic device and using an ASR machine learning model and an entity prediction machine learning model, an out-of-vocabulary prediction of an entity, wherein a buffer of the electronic device tracks alignment of outputs from the ASR machine learning model and inputs of the entity prediction machine learning model, and wherein, and wherein performing the out-of-vocabulary prediction of the entity using the ASR machine learning model and the entity prediction machine learning model comprises:
  - predicting a domain label for at least a portion of the audio input;
  - selecting, using the predicted domain label, a preexisting domain-specific deterministic acyclic finite state automaton (DAFSA) for the predicted domain label from a knowledge base including a plurality of preexisting domain-specific DAFSAs;
  - determining, at each time step of a plurality of time steps using the selected pre-existing domain-specific DAFSA from the knowledge base, a portion of a candidate for the entity;
  - assigning, at each time step, an intermediate candidate score for each portion of the candidate determined using the selected pre-existing domain-specific DAFSA, wherein the intermediate candidate score is a combination of an ASR machine learning model score and an entity prediction machine learning model score; and
  - determining a final candidate score for the candidate based on a combination of the intermediate candidate score for each portion of the candidate;
- receiving, based on the final candidate score, based on the final candidate score, an ASR hypothesis including the predicted entity; and
- outputting text including the predicted entity.

9. The method of claim 8, wherein performing the out-of-vocabulary prediction of the entity further includes:
- decoding, by the at least one processor, one or more portions of the audio input using the ASR machine learning model;
- predicting, by the at least one processor, the domain label for a subsequent portion of the audio input based on the one or more decoded portions of the audio input;
- retrieving, by the at least one processor for the predicted domain label using the knowledge base, a plurality of candidates for the entity;
- determining, by the at least one processor, the final candidate score for each of the plurality of candidates; and
- selecting, by the at least one processor, one of the plurality of candidates based on the final candidate score for each of the plurality of candidates.

10. The method of claim 9, wherein retrieving the plurality of candidates includes:
- traversing, by the at least one processor at each time step, the DAFSA for the predicted domain label; and
- determining, by the at least one processor at each time step, at least one portion of one of the plurality of candidates based on the traversal of the DAFSA.

11. The method of claim 9, wherein receiving the ASR hypothesis includes:
- determining, by the at least one processor, one or more ASR hypotheses for the audio input, wherein at least one of the ASR hypotheses is based on the selected candidate; and
- selecting, by the at least one processor, the ASR hypothesis from the one or more ASR hypotheses based on probabilities associated with the one or more ASR hypotheses.

12. The method of claim 9, further comprising identifying, by the at least one processor using the entity prediction machine learning model, nonoverlapping spans of entities in a set of spans and at least one domain associated with each of the nonoverlapping spans of entities.

13. The method of claim 12, wherein identifying the nonoverlapping spans of entities includes:
- assigning, by the at least one processor using the entity prediction machine learning model, a confidence score for each span; and removing from consideration, by the at least one processor, one or more spans from the set of spans based on a determination that the confidence score for each of the one or more spans is below a threshold.

14. The method of claim 9, further comprising modifying, by the at least one processor, the final candidate score for at least one of the plurality of candidates based on probability information including at least one of: candidate popularity, user information, user preferences, user context, and user utterance history.

15. A non-transitory computer readable medium embodying a computer program, the computer program comprising instructions that when executed cause at least one processor of an electronic device to:
receive, via an audio sensor of the electronic device, an audio input;
perform, using an automatic speech recognition (ASR) machine learning model and an entity prediction machine learning model, an out-of-vocabulary prediction of an entity, wherein the ASR machine learning model and the entity prediction machine learning model are jointly-trained as a multi-task architecture and are configured to use a buffer to align outputs and inputs between the ASR machine learning model and the entity prediction machine learning model, and wherein the instructions that when executed cause the at least one processor to perform the out-of-vocabulary prediction of the entity using the ASR machine learning model and the entity prediction machine learning model comprise instructions that when executed cause the at least one processor to:
predict a domain label for at least a portion of the audio input;
select, using the predicted domain label, a preexisting domain-specific deterministic acyclic finite state automaton (DAFSA) for the predicted domain label from a knowledge base including a plurality of preexisting domain-specific DAFSAs;
determine, at each time step of a plurality of time steps using the selected pre-existing domain-specific DAFSA from the knowledge base, a portion of a candidate for the entity;
assign, at each time step, an intermediate candidate score for each portion of the candidate determined using the selected pre-existing domain-specific DAFSA, wherein the intermediate candidate score is a combination of an ASR machine learning model score and an entity prediction machine learning model score; and
determine a final candidate score for the candidate based on a combination of the intermediate candidate score for each portion of the candidate;
receive an ASR hypothesis including the predicted entity; and
output text including the predicted entity.

16. The non-transitory computer readable medium of claim 15, wherein the instructions that when executed cause the at least one processor to perform the out-of-vocabulary prediction of the entity further comprise instructions that when executed cause the at least one processor to:
decode one or more portions of the audio input using the ASR machine learning model;
predict the domain label for a subsequent portion of the audio input based on the one or more decoded portions of the audio input;
retrieve, for the predicted domain label using the knowledge base, a plurality of candidates for the entity;
determine the final candidate score for each of the plurality of candidates; and
select one of the plurality of candidates based on the final candidate score for each of the plurality of candidates.

17. The non-transitory computer readable medium of claim 16, wherein the instructions that when executed cause the at least one processor to retrieve the plurality of candidates comprise instructions that when executed cause the at least one processor to:
traverse, at each time step, the DAFSA for the predicted domain label; and
determine, at each time step, at least one portion of one of the plurality of candidates based on the traversal of the DAFSA.

18. The non-transitory computer readable medium of claim 16, wherein the instructions that when executed cause the at least one processor to receive the ASR hypothesis comprise instructions that when executed cause the at least one processor to:
determine one or more ASR hypotheses for the audio input, wherein at least one of the ASR hypotheses is based on the selected candidate; and
select the ASR hypothesis from the one or more ASR hypotheses based on probabilities associated with the one or more ASR hypotheses.

19. The non-transitory computer readable medium of claim 16, wherein the computer program further comprises instructions that when executed cause the at least one processor to identify, using the entity prediction machine learning model, nonoverlapping spans of entities in a set of spans and at least one domain associated with each of the nonoverlapping spans of entities.

20. The non-transitory computer readable medium of claim 19, wherein the instructions that when executed cause the at least one processor to identify the nonoverlapping spans of entities comprise instructions that when executed cause the at least one processor to:
assign, using the entity prediction machine learning model, a confidence score for each span; and
remove from consideration one or more spans from the set of spans based on a determination that the confidence score for each of the one or more spans is below a threshold.

* * * * *